US008065277B1

(12) United States Patent
Gardner et al.

(10) Patent No.: US 8,065,277 B1
(45) Date of Patent: Nov. 22, 2011

(54) SYSTEM AND METHOD FOR A DATA EXTRACTION AND BACKUP DATABASE (76) Inventors: Daniel John Gardner, St. Louis Park, MN (US); Maurilio Torres, Minneapolis, MN (US)

( * ) Notice: Subject to any disclaimer, the term of this patent is extended or adjusted under 35 U.S.C. 154(b) by 0 days.

(21) Appl. No.: 10/759,623

(22) Filed: Jan. 16, 2004

Related U.S. Application Data (63) Continuation-in-part of application No. 10/697,728, filed on Oct. 30, 2003, now abandoned.

(60) Provisional application No. 60/440,855, filed on Jan. 17, 2003.

(51) Int. Cl.
*G06F 7/00* (2006.01)
*G06F 17/00* (2006.01)
*G06F 17/30* (2006.01)

(52) U.S. Cl. .................................. 707/673; 707/741

(58) Field of Classification Search .............. 707/100, 707/101, 102, 673, 741
See application file for complete search history.

(56) References Cited

U.S. PATENT DOCUMENTS

| | | | |
|---|---|---|---|
| 5,107,419 A | 4/1992 | MacPhail | |
| 5,350,303 A | 9/1994 | Fox et al. | |
| 5,535,381 A | 7/1996 | Kopper | |
| 5,617,566 A | 4/1997 | Malcolm | |
| 5,689,699 A | 11/1997 | Howell et al. | |
| 5,717,913 A | 2/1998 | Driscoll | |
| 5,732,265 A | 3/1998 | Dewitt et al. | |
| 5,742,807 A * | 4/1998 | Masinter | 707/1 |
| 5,778,395 A | 7/1998 | Whiting et al. | |
| 5,813,009 A | 9/1998 | Johnson et al. | |
| 5,813,015 A | 9/1998 | Pascoe | |
| 5,926,811 A | 7/1999 | Miller et al. | |
| 5,937,401 A | 8/1999 | Hillegas | |
| 5,982,370 A | 11/1999 | Kamper | |
| 6,023,710 A | 2/2000 | Steiner et al. | |
| 6,047,294 A | 4/2000 | Deshayes et al. | |
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 | 3/2001 | Geller | |
| 6,199,081 B1 | 3/2001 | Meyerzon et al. | |
| 6,216,123 B1 | 4/2001 | Robertson et al. | |
| 6,226,630 B1 | 5/2001 | Billmers | |
| 6,226,759 B1 | 5/2001 | Miller et al. | |
| 6,240,409 B1 | 5/2001 | Aiken | |
| 6,243,713 B1 | 6/2001 | Nelson et al. | 1/1 |
| 6,256,633 B1 | 7/2001 | Dharap | |

(Continued)

OTHER PUBLICATIONS

Amati, G. et al.; "Probabilistic Models of Information Retreival Based on Measuring the Divergence from Randomness"; ACM Transactions on Information Systems, vol. 20, No. 4. Oct. 2002.

(Continued)

*Primary Examiner* — Jacob F Betit
(74) *Attorney, Agent, or Firm* — Berry & Associates P.C.

(57) ABSTRACT

Methods and systems for storing information extracted from a file are presented. These methods and systems can be used to store content and metadata extracted from a file, and to associate the content and metadata so a holistic image of the file may be maintained. Additionally, these methods and systems may allow the location of a file to be stored and associated with the content or metadata of the file. Methods, systems and databases of this type may be especially useful in avoiding duplication of data by allowing the content and metadata of files to be compared to previously stored content and metadata.

21 Claims, 7 Drawing Sheets

U.S. PATENT DOCUMENTS

| | | |
|---|---|---|
| 6,269,382 B1 | 7/2001 | Cabrera et al. |
| 6,278,992 B1 | 8/2001 | Curtis et al. |
| 6,324,548 B1 | 11/2001 | Sorenson |
| 6,389,403 B1 | 5/2002 | Dorak |
| 6,421,767 B1 | 7/2002 | Milillo et al. |
| 6,477,544 B1 | 11/2002 | Bolosky et al. |
| 6,493,711 B1 | 12/2002 | Jeffrey |
| 6,662,198 B2 | 12/2003 | Satyanarayanan et al. ............ 1/1 |
| 6,708,165 B2 | 3/2004 | Jeffrey |
| 6,745,197 B2 | 6/2004 | McDonald |
| 6,751,628 B2 | 6/2004 | Coady |
| 6,778,979 B2 | 8/2004 | Grefenstette et al. |
| 6,810,395 B1 | 10/2004 | Bharat |
| 6,834,110 B1 | 12/2004 | Marconcini et al. |
| 6,859,800 B1 | 2/2005 | Roche et al. |
| 6,915,435 B1 | 7/2005 | Merriam |
| 6,928,526 B1 * | 8/2005 | Zhu et al. ....................... 711/154 |
| 6,947,954 B2 * | 9/2005 | Cohen et al. ................ 707/104.1 |
| 6,954,750 B2 | 10/2005 | Bradford ............................. 1/1 |
| 6,996,580 B2 | 2/2006 | Bae et al. |
| 7,047,386 B1 | 5/2006 | Ngai et al. |
| 7,089,286 B1 | 8/2006 | Malik |
| 7,137,065 B1 | 11/2006 | Huang et al. |
| 7,146,388 B2 | 12/2006 | Stakutis et al. |
| 7,174,368 B2 | 2/2007 | Ross, Jr. ....................... 709/207 |
| 7,260,568 B2 | 8/2007 | Zhang et al. |
| 7,269,564 B1 | 9/2007 | Milsted et al. |
| 7,284,191 B2 | 10/2007 | Grefenstette et al. |
| 7,287,025 B2 | 10/2007 | Wen et al. |
| 7,313,556 B2 | 12/2007 | Gallivan et al. |
| 7,325,041 B2 | 1/2008 | Hara et al. |
| 7,458,082 B1 | 11/2008 | Slaughter et al. ............. 719/328 |
| 7,526,478 B2 | 4/2009 | Friedman |
| 7,533,291 B2 | 5/2009 | Lin |
| 7,650,341 B1 | 1/2010 | Oratovsky et al. |
| 2002/0002468 A1 | 1/2002 | Spagna et al. |
| 2002/0019814 A1 | 2/2002 | Ganesan |
| 2002/0038296 A1 | 3/2002 | Margolus et al. |
| 2002/0059317 A1 | 5/2002 | Black et al. |
| 2002/0107803 A1 | 8/2002 | Lisanke et al. |
| 2002/0107877 A1 | 8/2002 | Whiting et al. |
| 2002/0116402 A1 | 8/2002 | Luke |
| 2002/0120925 A1 | 8/2002 | Logan |
| 2002/0138376 A1 | 9/2002 | Hinkle |
| 2002/0140960 A1 | 10/2002 | Ishikawa |
| 2002/0143737 A1 | 10/2002 | Seki et al. |
| 2002/0143871 A1 | 10/2002 | Meyer et al. |
| 2002/0147733 A1 | 10/2002 | Gold et al. |
| 2002/0161745 A1 | 10/2002 | Call ................................ 707/1 |
| 2002/0178176 A1 | 11/2002 | Sekiguchi et al. |
| 2002/0194324 A1 | 12/2002 | Guha |
| 2003/0028889 A1 | 2/2003 | McCoskey et al. |
| 2003/0069803 A1 | 4/2003 | Pollitt |
| 2003/0069877 A1 | 4/2003 | Grefenstette et al. |
| 2003/0105718 A1 | 6/2003 | Hurtado et al. |
| 2003/0110130 A1 | 6/2003 | Pelletier |
| 2003/0126247 A1 | 7/2003 | Strasser et al. |
| 2003/0126362 A1 | 7/2003 | Camble et al. |
| 2003/0135464 A1 | 7/2003 | Mourad et al. |
| 2003/0145209 A1 | 7/2003 | Eagle et al. |
| 2003/0182304 A1 | 9/2003 | Summerlin et al. |
| 2003/0233455 A1 | 12/2003 | Leber et al. |
| 2004/0034632 A1 | 2/2004 | Carmel et al. |
| 2004/0054630 A1 | 3/2004 | Ginter et al. |
| 2004/0064447 A1 | 4/2004 | Simske et al. |
| 2004/0064537 A1 | 4/2004 | Anderson et al. |
| 2004/0068604 A1 | 4/2004 | Le et al. |
| 2004/0083211 A1 | 4/2004 | Bradford ........................ 707/3 |
| 2004/0143609 A1 | 7/2004 | Gardner et al. |
| 2004/0158559 A1 | 8/2004 | Poltorak ........................ 707/3 |
| 2004/0186827 A1 | 9/2004 | Anick et al. |
| 2004/0193695 A1 | 9/2004 | Salo et al. |
| 2004/0205448 A1 | 10/2004 | Grefenstette et al. |
| 2005/0097081 A1 | 5/2005 | Sellen et al. |
| 2005/0097092 A1 | 5/2005 | Annau et al. |
| 2005/0144157 A1 | 6/2005 | Moody et al. |
| 2005/0160481 A1 | 7/2005 | Todd et al. |
| 2005/0223067 A1 | 10/2005 | Buchheit et al. |
| 2005/0234843 A1 | 10/2005 | Beckius et al. |
| 2005/0283473 A1 | 12/2005 | Rousso et al. |
| 2006/0167842 A1 | 7/2006 | Watson ............................ 707/3 |
| 2006/0173824 A1 | 8/2006 | Bensky et al. |
| 2006/0230035 A1 | 10/2006 | Bailey et al. |
| 2007/0011154 A1 | 1/2007 | Musgrove et al. |
| 2007/0033177 A1 | 2/2007 | Friedman |
| 2007/0033183 A1 | 2/2007 | Friedman |
| 2007/0033410 A1 | 2/2007 | Eagle et al. ................. 713/176 |
| 2007/0038616 A1 | 2/2007 | Guha |
| 2007/0050339 A1 | 3/2007 | Kasperski et al. ................ 707/3 |
| 2007/0050351 A1 | 3/2007 | Kasperski et al. ................ 707/4 |
| 2007/0061335 A1 | 3/2007 | Ramer et al. |
| 2007/0088687 A1 | 4/2007 | Bromm et al. |
| 2007/0192284 A1 | 8/2007 | Finley et al. |
| 2007/0198470 A1 | 8/2007 | Freedman et al. |
| 2007/0233692 A1 | 10/2007 | Lisa et al. |
| 2007/0245108 A1 | 10/2007 | Yasaki et al. |
| 2007/0253643 A1 | 11/2007 | Nagarajan |
| 2007/0255686 A1 | 11/2007 | Kemp et al. |
| 2007/0266009 A1 | 11/2007 | Williams |
| 2007/0282811 A1 | 12/2007 | Musgrove |
| 2007/0282826 A1 | 12/2007 | Hoeber et al. |
| 2007/0288450 A1 | 12/2007 | Datta et al. |
| 2008/0005651 A1 | 1/2008 | Grefenstette et al. |
| 2008/0059187 A1 | 3/2008 | Roitblat et al. |
| 2008/0059512 A1 | 3/2008 | Roitblat et al. |
| 2008/0077570 A1 | 3/2008 | Tang et al. |
| 2008/0097975 A1 | 4/2008 | Guay et al. |
| 2008/0104032 A1 | 5/2008 | Sarkar |
| 2008/0147644 A1 | 6/2008 | Aridor et al. |
| 2008/0162498 A1 | 7/2008 | Omoigui |
| 2008/0195601 A1 | 8/2008 | Ntoulas et al. |
| 2009/0024612 A1 | 1/2009 | Tang et al. |
| 2009/0182737 A1 | 7/2009 | Melman |

OTHER PUBLICATIONS

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant? . . . Probably: A Survey of Probabilistic Models in Information Retrieval"; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.

http://www.lexisnexis.com/toolbar/help/using.

htm#HighlightAndClick <retrieved on Jul. 8, 2009>.

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retreival"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: 1-4244-0366-7.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," *The Sedona Conference Working Group Series*, Jul. 2005 Version.

Meng, W., et al., "Building Efficient and Effective Metasearch Engines," *ACM Computing Surveys, ACM*, New York, NY, US, US, vol. 34, No. 1, Mar. 1, 2002, pp. 48-89.

Comparing IBM Tivoli Storage Manager and VERITAS NetBackup in Real-World Environments. A summary by IBM of the whitepaper and benchmark written by Progressive Strategies, Nov. 8, 2002.

Beyond Backup Toward Storage Management by M. Kaczmarski, T. Jiang and D.A. Pease. IBM Systems Journal, vol. 42, pp. 322-337, Nov. 2, 2003.

PCT Search Report and Written Opinion dated Jun. 18, 2008, PCT/US07/13483.

PCT Search Report and Written Opinion dated May 8, 2009, PCT/US2009/032990.

\* cited by examiner

SYSTEM AND METHOD FOR A DATA EXTRACTION AND BACKUP DATABASE

RELATED APPLICATIONS

This application claims priority under 35 U.S.C. §119(e) to U.S. Patent Application No. 60/440,855 entitled "System and Method for Data Extraction in a Non-Native Environment, Date De-Duplication, Database Creation and Manipulation, Image Back-up and PST File Monitoring" by Gardner et al. filed Jan. 17, 2003, which is assigned to the current assignee hereof and incorporated herein by reference. This application claims priority under 35 U.S.C. §120 to and is a continuation-in-part of U.S. patent application Ser. No. 10/697,728, entitled "System and Method for Data Extraction in a Non-Native Environment" by Gardner et al. filed Oct. 30, 2003 now abandoned, which is assigned to the current assignee hereof and incorporated herein by reference. This application is related to U.S. patent application Ser. Nos. 10/759,622, entitled "Method and System for Enterprise-Wide Retention of Digital or Electronic Data" by Robert Gomes filed on Jan. 16, 2004, 10/759,663, entitled "System and Method for Data Extraction from E-mail Files" by Gardner et al. filed on Jan. 16, 2004, 10/759,599, entitled "System and Method for Data De-Duplication" by Gardner et al. filed on Jan. 16, 2004, 10/759,643, entitled "Method and System for Forensic Imaging to Virtual Media" by Gardner et al. filed on Jan. 16, 2004, and 10/760,010, entitled "System and Method of Monitoring a Personal Folder File" by Gardner et al. filed on Jan. 16, 2004, all of which are assigned to the current assignee hereof and incorporated herein by reference.

FIELD OF THE INVENTION

This invention relates to extracting data from disparate locales, and more particularly, to methods and systems for extracting and storing data from disparate locales without unnecessary duplication.

BACKGROUND OF THE INVENTION

Vast amounts of active and archived corporate electronic information exists on backup tape media. Retrieving and collating this data is becoming increasingly important as the information is not only utilized for knowledge management, but may also be the subject of discovery requests by attorneys engaged in litigation involving the corporation. Conventional methods of producing data from large quantities of backup tapes are difficult to implement, cost prohibitive, or both.

Managing data from backup media is particularly problematic in the case where companies have many different tape backup systems using different backup environments.

A previous attempt to solve the problem of retrieving information from backup tapes involves restoring the tapes using a "Native Environment" (NE) approach. The NE approach recreates the original backup environment from which the tape was generated so that data from the tapes can be restored and moves the restored data from the replicated environment to a target storage system for further analysis.

Replicating the NE in order to restore backup tapes requires that all server names, configurations, software versions, user names, and passwords are consistent with the environment as it stood at the time of the backup. Replicating all of this information becomes quite challenging as systems age, names of systems change, passwords change, software versions change, and administrators change. Furthermore, backup software is typically designed to restore data for the purposes of disaster recovery (an all or nothing proposition) and not to intelligently process large amounts of data from large numbers of media to obtain only relevant information.

Even if the backup environment can be recreated, however, all the records may need to be examined. Those records may contain information regarding thousands of employees in the case of a large company. Managing all this data is a nightmare, even if the environment can be recreated. For many companies, the amount of information can exceed a terabyte. Storing over a terabyte of information takes a great deal of memory space and consumes valuable computer resources during the storing operation.

Beyond trying to manage the sheer volume of data, other problems exist. Most backup systems retrieve data for backup on a regular schedule, however, this means that with every successive backup much of the data saved is a duplicate of data saved during the previous backup. This is especially problematic as data sensitivity increases, as backup frequency usually increases commensurately with data sensitivity. Additionally, though the data itself may be duplicative, the location where this duplicative data is found may be different, and the location where the data resides may be of importance as well. As, for example, when this data must be restored to its original locale.

Thus there is a need for systems and methods to store and collate data from disparate locales which retains the location of various pieces of data without duplicating identical data.

SUMMARY OF THE INVENTION

Systems and methods for the storage of files which allow the storage of components of a file and the linking of those components are disclosed. These systems and methods may store the content and metadata of a file, and link the content with the metadata. These same systems and methods may allow the storage of a location of a file and the linking of this location with a stored piece if content or metadata.

In one embodiment, content and metadata on a file are obtained, stored, and associated with one another.

In another embodiment, the content is stored in a content hash table and the metadata is stored in a metadata hash table In another set of embodiments a digital signature is generated from the content and the metadata and these digital signatures serve as indices into the hash tables.

In yet other embodiments, the digital signature is generated using the SHA1 hashing algorithm.

In still other embodiments, the entry in the content hash table comprises the content and a link to the metadata.

Additionally, systems and apparatuses are presented which embody these methodologies in computer systems, hardware, databases, and software.

These, and other, aspects of the invention will be better appreciated and understood when considered in conjunction with the following description and the accompanying drawings. A reader should be understood, however, that the following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while disclosing preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow. As used in this specification, a file may consist of one or more components, these components can include the contents, metadata, and location of a file. The contents may be the string of bytes or information that make up the file, the metadata may be information pertaining to a variety of aspects of the file such as the file name, date of creation, date of last modification, length, etc., and the location of the file may refer to the volume or source container where the file was originally stored. A file in this context may refer to any string of bits or electronic asset, such as programs, text, directory, data, email and/or their respective components or any subset thereof.

Media may refer to any medium, whether it is backup tapes, CD ROM, hard disk or any similar storage media. Initially, files may reside on any number of different mediums operating on different platforms. Files may also be located on backup tapes created from any number of different backup systems and strategies. However, media may also refer to the original storage location of these files. Original data refers to files as they exist before they accessed by embodiments of the present invention, whether extant on backup media or in active use.

The methods and systems described in more detail below can be used to extract data directly from media to a target location without the replication of duplicate data. The increased speed and efficiency allowed by these systems and methods allow previously cost prohibitive data production jobs to be performed within reasonable cost and time parameters. By ameliorating the problems involved with the duplication of data, these methods and systems also decrease the expense of hardware used to implement the database which stores extracted data.

Furthermore, the location of duplicate data may be stored within the same database without the storage of the duplicate data itself. A suite of software applications can be used to extract data from any environment, any operating system, basically any host platforms and any backup system tape while simultaneously retaining information on the location of the data and filtering duplicative information. These capabilities significantly curtail the amount of storage required for the data extracted by ensuring that duplicate data is not stored in the database.

Figure 1:
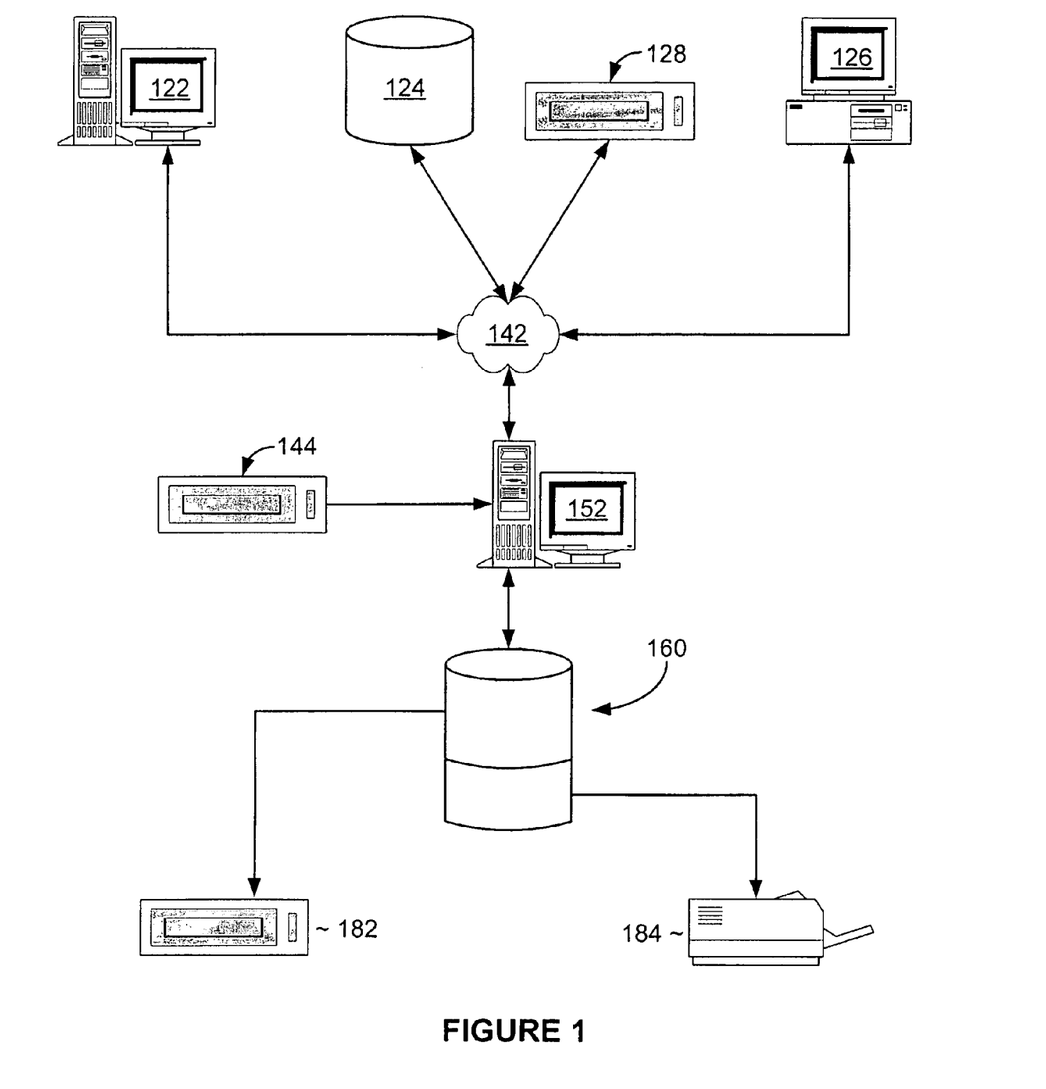
FIG. 1 includes an illustration of a computing system to obtain data from a backup medium using a non-native environment in accordance with an embodiment of the present invention.

Before discussing embodiments of the present invention, an exemplary hardware and software architecture for using embodiments of the present invention is described. FIG. 1 illustrates such an exemplary hardware architecture and includes network 142. Bi-directionally coupled to the network 142 are server computer 122, enterprise database 124, client computer 126, backup media 128, and database server computer 152. Database server computer 152 may be coupled to database 160. Database 160 may be coupled to a persistent storage medium 182, such as an optical storage or tape drive, and input/output device ("I/O") 184, such as a printer or monitor.

Database 160 may allow the contents of a file to be associated with metadata and locations pertaining to the file, furthermore database 160 may allow stored content to be associated with multiple locations and pieces of stored metadata, stored metadata to be associated with multiple locations and pieces of stored content, and stored locations to be associated with multiple pieces of stored metadata and content. In one embodiment, database 160 may be a single depository that has the ability to store and relate the contents, metadata, or location of a file extracted from server computer 122, enterprise database 124, client computer 126, or backup media 128.

Figure 2:
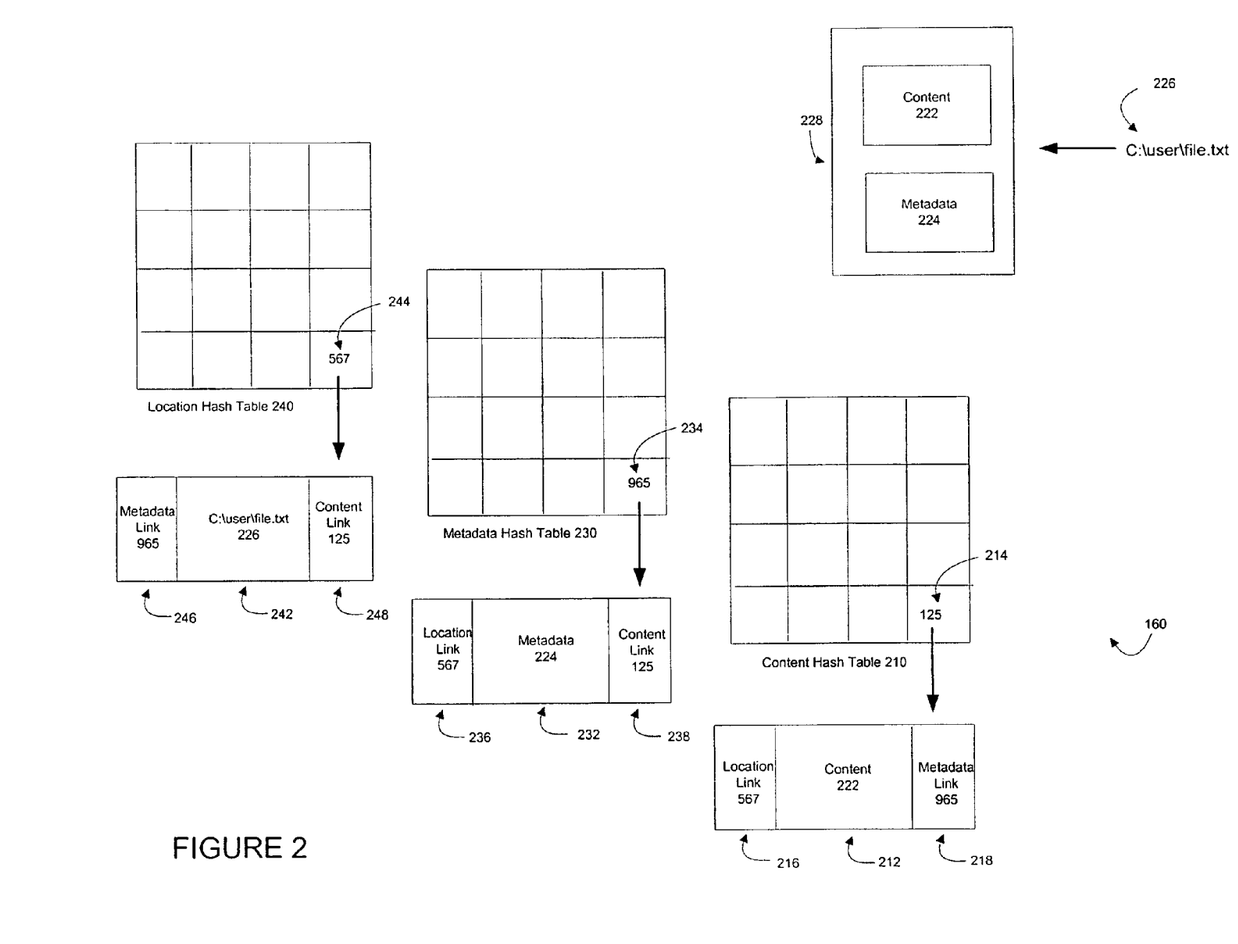
FIG. 2 includes an illustration of a database layout in keeping with the present invention.

FIG. 2 depicts the layout of one embodiment of such a database 160. File 228, originally resident at location C:\user\file.txt 226, may be stored in database 160 as three separate components, content 222 of file 228, metadata 224 pertaining to file 228, and original location of file 226. Hash tables 240, 230, 210 of the type commonly known in the art are used to contain file location data 226, metadata 224, and content 222 respectively. In many embodiments, components 222, 224, 226 of file 228 are linked together in database 160 to facilitate reconstruction of file 228 and to avoid the storage of duplicative content 222 and metadata 224 as described later.

In one embodiment, when file 228 is extracted from location 226, content 222 and metadata 224 portions of file 228 may be defined. Content 222, metadata 224, and location 226 of file 228 will then be hashed to generate substantially unique hash values 214, 234, 244. The resulting digital signatures 214, 234, 244 will be used as index values into the corresponding hash tables 210, 230, 240. For example, content 222 may hash to the value of 125 (214), this value 214 may in turn serve as an index into content hash table 210, and the entry 212 in content hash table 210 corresponding to hash value 214 may contain the original content 222 of file 228. Additionally, entry 212 in content hash table 210 may contain links 216, 218 to associated locations 226 or metadata 224 of file 228 or possible other locations and metadata associated with content 222. In some embodiments, these links 216, 218 may be the hash values 244, 234 of location 226, and metadata 224; these hash values 244, 234 serve as indexes into location and metadata hash tables 240, 230 as described below.

Similarly, metadata 224 and location 226 of file 228 may be hashed to generate substantially unique digital signatures 234, 244. These signatures 234, 244 may then serve as index values into metadata and location hash tables 230, 240 respectively. Additionally, entries (e.g., entry 232) in metadata hash table 230 may contain links 236, 238 to location 226 and content 222 corresponding to file 228, while entries (e.g., entry 242) in location hash table 240 may contain links 246, 248 to content 222 and metadata 224 corresponding to file 228. These links 236, 238, 246, 248 may consist of the associated digital signature for the location 226, content 222, and metadata 224. In this manner file 228 may be stored in database 160 and reconstituted at will. Additionally, access to any component 222, 224, 226 of file 228 in database 160 will allow access to any other component of file 228 as will be apparent to one of ordinary skill in the art. It will also be apparent that these same structures may be used to store and link as many or as few components or pieces of information as is desired. An exemplary embodiment of database 160 is illustrated in Example 1.

Returning to the structure of FIG. 1 momentarily, additional server computers (similar to server computer 122), enterprise databases (similar to enterprise database 124), client computers (similar to client computer 126), and backup media (similar to backup media 128) may be bi-directionally coupled to network 142 but are not shown in FIG. 1. An example of client computer 126 may include a desktop computer, a laptop computer, a personal digital assistant, a cellular phone, a workstation, or nearly other device capable of communicating over network 142.

Although not shown, each database 124 may include a database server computer used to process instructions sent over network 142 to its corresponding database. Database 160 may be coupled to many other devices in addition to or instead of persistent storage medium 182 and I/O 184.

Each of the computers may comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Additionally each of the computers in FIG. 1 may have more than one CPU, ROM, RAM, HD, I/O, or other hardware components. Note that FIG. 1 is a simplification of an exemplary hardware configuration. Many other alternative hardware configurations are possible and known to skilled artisans.

Each of the computers in FIG. 1 is an example of a data processing system. ROM, RAM, and HD can include media that can be read by the CPUs. Therefore, each of these types of memories includes a data processing system readable medium. These memories may be internal or external to the computers.

Portions of the methods described herein may be implemented in suitable software code that may reside within ROM, RAM, or a hard disk. The instructions in an embodiment of the present invention may be contained on a data storage device, such as a hard disk. For example, in one embodiment, a combination of software code elements are embodied within a data processing system readable medium on HD. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of assembly code, compiled C, C++, Java, or other language code. Other architectures may be used. For example, the functions of any one of the computers may be performed by a different computer shown in FIG. 1. Additionally, a computer program or its software components with such code may be embodied in more than one data processing system readable medium in more than one computer.

In the hardware configuration above, the various software components may reside on a single computer or on any combination of separate computers. In alternative embodiments, some or all of the software components may reside on the same computer. For example, one or more the software component(s) of server computer 122 could reside on client computer 126, a database server computer 152, or any combination thereof.

Communications between any of the computers in FIG. 1 can be accomplished using electronic, optical, radio-frequency, or other signals. For example, when a user is at client computer 126, client computer 126 may convert the signals to a human understandable form when sending a communication to the user and may convert input from a human to appropriate electronic, optical, radio-frequency, or other signals to be used by, a database server computer. Similarly, when an operator is at database server computer 152, the database server computer 152 may convert the signals to a human understandable form when sending a communication to the operator and may convert input from a human to appropriate electronic, optical, radio-frequency, or other signals to be used by any of the computers.

Attention is now directed to systems and methods to place the electronic information (or data) from back-up storage devices (e.g., tapes, such as tapes 144), network devices (e.g., servers, such as server 122) or other media onto a storage medium which may include a database (e.g., database 160) and to apply a retention policy to the information (prior to, concurrently with, or after the information has been placed on database 160) so that the information remaining in database 160 is only information that meets the criteria of the retention policy. The database 160 may be populated from historical back-up data. The collection of information to populate the database 160 can include a de-duplication step to ensure database 160 does not contain duplicate copies of content.

Figure 3:
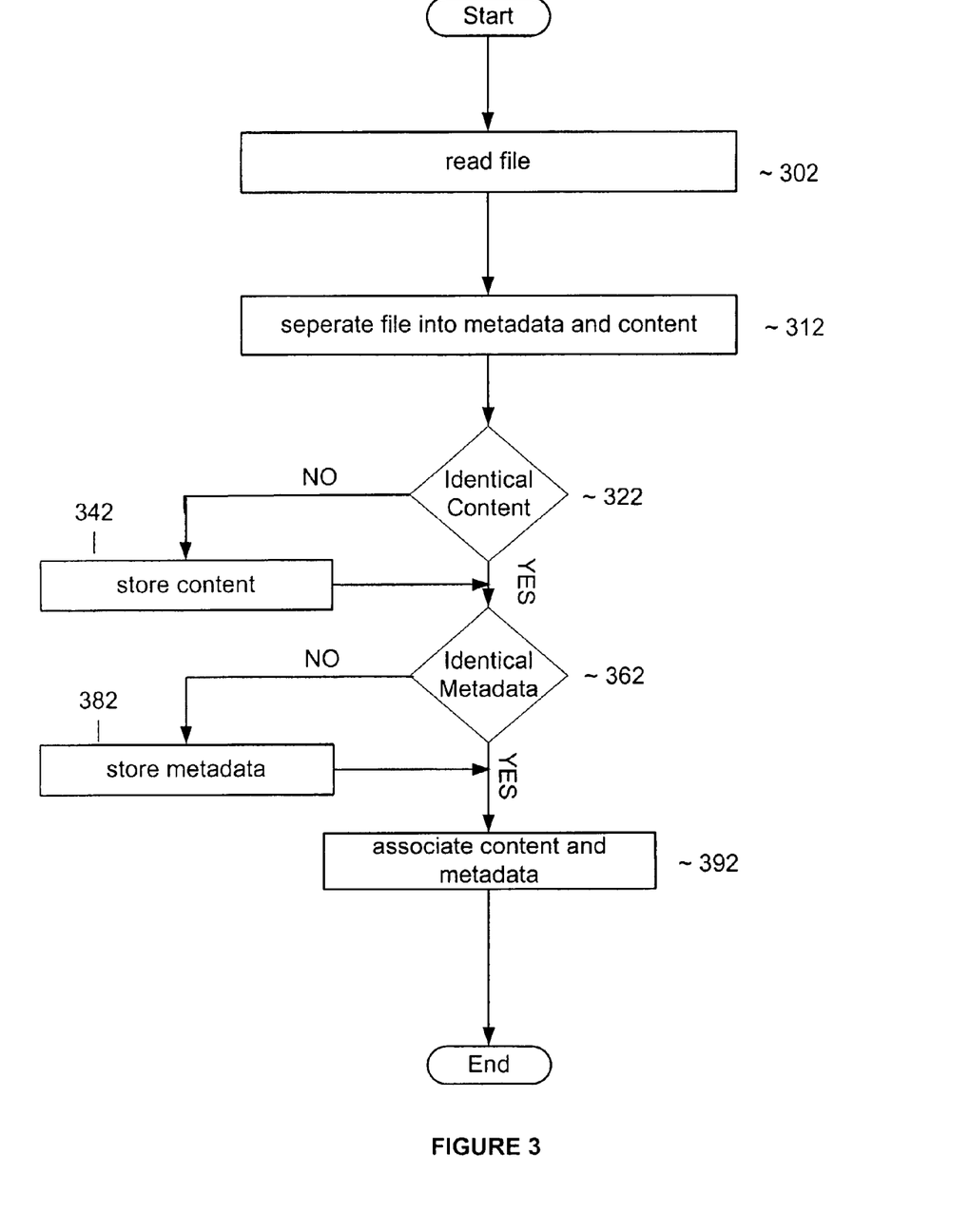
FIG. 3 includes a process flow diagram for extracting data from disparate locales without unnecessary duplication.

These methods and systems can involve taking data (eMail, files, etc.) directly from the backup media 162, 166 and storing it to a database, which may reside on hard disk 164. FIG. 3 illustrates one method for extracting data from a backup medium and storing it to a database without storing duplicative components.

In one embodiment, as illustrated in the flow chart of FIG. 3, the method can comprise communicating with the hardware (e.g., understand the stored data formats/hardware protocols (e.g., SCSI) in order to read the raw data) to read a file (block 302), discerning the respective content and metadata of the extracted file (block 312), comparing the content of the extracted file with the previously stored content (block 322), and if substantially identical content is not found during this comparison, storing the content (block 342), next comparing the metadata of the file with previously stored metadata (block 362) and storing the metadata if substantially identical metadata is not found (block 382), metadata and content can then be associated based upon the presence or absence of identical previously stored content or metadata (block 392).

Note that not all of the activities described in the process flow diagram are required, that an element within a specific activity may not be required, and that further activities may be performed in addition to those illustrated. Additionally, the order in which each of the activities are listed is not necessarily the order in which they are performed. After reading this specification, a person of ordinary skill in the art will be capable of determining which activities orderings best suit any particular objective.

In one embodiment, the methods and systems of the present invention may include reading files from various data sources 122, 124, 126, 128, 144 (block 302 in FIG. 3). When archiving data from a variety of sources the initial step is to extract a file from a medium (block 302). Generally speaking, communication with hardware is done according to a specification for the hardware devices (e.g., the SCSI protocol for SCSI devices). In order to read the raw data from a medium, the system needs to recognize the type of device (i.e., reading from a SCSI storage device) on which the data is stored in order to understand the protocol that allows reading the data directly from the device. Thus, the communication with the hardware and reading the raw data directly requires identifying what type of device is being accessed (e.g., a SCSI device, a fibre channel device, etc.), and then based on the protocols for that particular device (e.g., SCSI, iSCSI, fibre channel, etc.), utilizing a software program that will go in and read the data directly from that device.

In order to develop the program for a particular protocol, a programmer would need to review protocol and understand to a certain degree the protocol in order to write a program that will extract the data from that type of protocol device directly. While there may be nuances about each different protocol (e.g., how you do it for a SCSI device may not be the same as how you it for a fibre channel device, etc), skilled artisans understand the protocols, and therefore, the process of extracting or reading these files will be apparent.

In order to do get access to the information on a backup tape, in one embodiment, the method can comprise communicating with the hardware to read a file (block 302). This communication may identify parameters used for conventional back systems, include the backup system used for a particular backup tape, the protocol used for the backup, notations for determining how individual files and other records are stored on the tape, and the like. By knowing that information, the database server computer 152 can determine the data structure of a backup tape without having to recreate the environment of the conventional backup system. Reading a file (block 302) from conventional backup tapes 144 can further comprise transferring original data from backup tape without recreating the native environment. Because database server 152 can be configured to understand the format of the information on the tape, the database server 152 can import the data in a form that is more easily and accurately managed.

In many instances, the information used to identify the backup application can be located in the first portion of the tape. In another embodiment the information may be at a different location(s), thus other portion(s) of the tape may be read. In still another embodiment, the entire tape may be read before starting to interpret or reverse engineer data from the tape. These other embodiments may be useful if the identifying signature of a tape or file would lie at an unconventional location (near the end of the tape or buried in between). Files may also be read (block 302) over network 142 from a variety of different sources including file systems resident on server and network computers not depicted.

However, not all files read (block 302) will necessarily need to be stored because many copies of an electronic file, electronic mail message, database record, or other electronic data may exist on many different computers or on backup tapes. In order to avoid this needless duplication of data, after a file is read (block 302) the file may be separated into its respective content and metadata (block 312), and these components compared to components already resident in database 160.

Database server 152 reads the content and obtains the corresponding file metadata. There may be a certain degree of overlap between components of a file, and database server may segregate content and metadata according to a variety of different circumstances and conventions which will be obvious to one of ordinary skill in the art. For a file, the metadata portion may include an Internet Protocol address or other address of a computer from which the file is obtained. Additional metadata pertaining to a file may include the file path and filename, date the file was last saved on that particular computer, a pointer to the content portion within that computer, size of the file, create, access, and modify dates, file type, owner/access information and the like.

After the metadata is separated from the content of a file (block 312) the content may be compared against the content previously extracted and already resident in database 160 (block 322). Comparing the content to previously extracted content may involve creating a digital signature from the content of the extracted file, and comparing this digital signature to the digital signature of content from previously extracted files. In particular embodiments of the invention this comparison may involve creating a digital signature by hashing at least a portion of the content of the extracted file to form hashed values.

These hash algorithms, when run on content produce a unique value such that if any change (e.g., if one bit or byte or one change of one letter from upper case to lower case) occurs, there is a different hash value (and consequently digital signature) for that changed content. This uniqueness is somewhat dependent on the length of the hash values, and as apparent to one of ordinary skill in the art, these lengths should be sufficiently large to reduce the likelihood that two files with different content portions would hash to identical values. When assigning a hash value to the content of an extracted file, the actual stream of bytes that make up the content may be used as the input to the hashing algorithm. The hashed values may also be used for storing data within database 160, as described above.

In one embodiment, the hash algorithm may be the SHA1 secure hash algorithm number one—a 160-bit hash. In other embodiments, more or fewer bits may be used as appropriate. A lower number of its may incrementally reduce the processing time, however, the likelihood that different content portions of two different files may be improperly detected has being the same content portion increases. After reading this specification, skilled artisans may choose the length of the hashed value according to the desires of their particular enterprise.

After hashing the content to create a digital signature, this digital signature may be used to compare the content of the extracted file to content of previously extracted file resident in database 160 (block 322). As described, database 160 may utilize a hash table to store the content of a file and the corresponding digital signature of that content. Thus, for each piece of content stored, the primary key into the hash table may be the hash value of that content.

Consequently, to compare the content of the extracted file to content already resident in database 160 (block 322) the hashed value of the content is compared to the hashed values contained in content hash table 210 for existing content in database 160. If the hash value is not identical to any previously stored hash values, this indicates that content identical to the content of the extracted file is not resident in database

160. In this case, the content of the extracted file may be stored in database 160 (block 342). In associated embodiments, the location from which the file was extracted is linked to the content of the extracted file in database 160.

Conversely, if during this comparison (block 322) the hash value is identical to a previously stored hash value in content hash table 210, content identical to the content of the extracted file is already present in database 160. In this case, there is no need to store the content of the extracted file, as identical content is already present in database 160. In certain embodiments, there may be rules which specify when to store content regardless of the presence of identical content in database 160. For example, a rule may exist that dictates that if content is part of an email attachment to store this content regardless whether identical content is found in database 160 during this comparison (block 322). Additionally, these type of rules may dictate that all duplicative content is to be stored unless it meets certain criteria.

However, it may be that not only do two files exist with the same content, but additionally that two files have the same metadata as well (e.g. the same file backed up on two separate occurrences). Embodiments of the invention may alleviate the need to store repetitive metadata by comparing the metadata of the extracted file with metadata previously stored in database 160 (block 362). This comparison (block 362) may be accomplished in substantially the same manner that the comparison of content is achieved. The metadata of the extracted file is hashed, this hash value is compared to the hash values of previously stored metadata in metadata hash table 230 of database 160. When hashing the metadata, a stream of metadata may be used as input to the hashing algorithm. For example, using a simple case, suppose the extracted file is named "FILE.TXT" with a last modified data of Jan. 14, 2003 at 4:20 PM, then an ASCII string such as "FILE.TXT|01-14-2003|16:20:00" may be used as input to the hashing algorithm to create a hash value for the metadata.

If a match is not found for this hash value in database 160 the metadata may be stored in database 160 (block 382). The location from which the file corresponding to the metadata was extracted may also be stored and associated with the metadata. If, however, a match is found, this indicates that identical metadata is already present in database 160. As with the content of a file, there may be rules which specify when to store metadata regardless of the presence of identical metadata in database 160. For example, a rule may exist that dictates that if metadata pertains to an email attachment to store this metadata regardless whether identical metadata is found in database 160. Additionally, these type of rules may dictate that all duplicative metadata is to be stored unless it meets certain criteria.

Once it is determined if identical content and metadata are present in database 160, these newly stored and previously stored pieces of content and metadata may be associated depending on the presence or absence of identical pieces of content and metadata. In most cases, four distinct scenarios may occur: 1) identical content and metadata were already present in database 160. The presence of both identical content and metadata indicates that there is no need to store either the content or the metadata of the extracted file, only to verify that these identical pieces of content and metadata are associated in database 160. 2) If identical content was present but identical metadata was not, the newly stored metadata of the extracted file may be associated with the previously stored identical content, creating a representation of the file in database 160. 3) The converse is true if identical metadata was present but identical content was not; the newly stored content of the extracted file may be associated with the previously stored identical metadata; and 4) if neither identical content nor identical metadata is found in database 160 the newly stored content and metadata of the extracted file may be associated. It will be understood by those of ordinary skill in the art that by judicious applications of the systems and methods presented duplicative data may be retained as desired.

Under any of these circumstances, the location of the extracted file may also be compared to a table of locations currently associated with the stored metadata and content. Similarly to the above operations, if an identical location is found, it may be verified that this location is associated with content and metadata (either previously or newly stored) pertaining to the extracted file. If the location of the extracted file is not present in database 160 it may be stored and appropriately associated with content or metadata (either previously or newly stored) pertaining to the extracted file.

As mentioned above, the steps in FIG. 3 may be preformed in any order, and steps may be added or removed as desired. For example, it would be obvious to those of skill in the art that metadata from the extracted file may be compared to previously stored metadata in database 160 before content from the extracted file is compared. In certain instances the presence or absence of this metadata may in and of itself indicate the presence or absence of identical content in database 160, just as the presence or absence of identical content in database 160 may indicate the presence or absence of identical metadata. In many of these cases the comparing, storing, and associating of these redundant components of a file may be obviated, or may occur with a reduction in steps.

EXAMPLE

Specific embodiments of the invention will now be further described by the following, nonlimiting example which will serve to illustrate in some detail various features. The following examples are included to facilitate an understanding of ways in which the invention may be practiced. Readers will appreciate that the examples which follow represent embodiments discovered to function well in the practice of the invention, and thus can be considered to constitute preferred modes for the practice of the invention. However, many changes can be made in the exemplary embodiments which are disclosed while still obtaining like or similar result without departing from the scope of the invention. Accordingly, the example should not be construed as limiting the scope of the invention.

Example 1

The following tables illustrates a database which may be used to store and link various components of an extracted file.

1.2) Design Considerations:

a) Metadata from files, directories, e-mail messages may be used to generate unique ID's for tables. The ID will be generated by combining metadata and using the RFC 3174 algorithm to produce a 160 bits hash value. The 160-bit key will be grouped in 4—bit hexadecimal numbers producing a 40-characters hexadecimal value.

b) The database may be designed to run on a Microsoft SQL Server DBMS.

2) DATABASE TABLES 2.1) Table prdSource

This table contains information regarding the source of the data (tape, hard drive, file system, etc.)

The primary key for this table is a four bytes (integer) field named SourceID. This field is auto generated by the database.

| Fields: | | | |
|---|---|---|---|
| Name | Type | Size | Comments |
| SourceID | Int | 4 | Not null, autonumber, unique |
| Type | Char | 20 | Not Null, (tape, hard drive, file system) |
| CreateDate | Datetime | 8 | Allows null |
| ModifyDate | Datetime | 8 | Allows null |
| AccessType | Datetime | 8 | Allows null |
| Attributes | Varchar | 50 | Allows null |
| VolumeName | Varchar | 256 | Allows null |
| JobNo | Varchar | 16 | Not Null, required, Renew Data Job Number |
| MediaNo | Varchar | 16 | Not Null, required, Renew Data Media Number |
| CustomerLabel | Varchar | 256 | Allows null |

Every record in this table will have a unique RecordJob-Number and MediaNumber.

2.2) Table prdFiles

This table contains information on file system files. Each entry in this table has metadata describing either a directory or a file.

The primary key for this table is a forty bytes long field named FileID. This field is computed using the hash algorithm based on values such as the ModifyDate, Type and AsciiName fields. In order to allow configurability to RIFT, the fields used by the hash algorithm will be stored on the registry. Two files that generate the same hash value are considered identical. This field is required and the database will check for its uniqueness.

| Fields: | | | |
|---|---|---|---|
| Name | Type | Size | Comment |
| FileID | Char | 40 | Not null, hashed, unique |
| Type | Varchar | 20 | Not null, directory or a file. |
| CreateDate | Datetime | 8 | Not null |
| ModifyDate | Datetime | 8 | Not null |
| AccessDate | Datetime | 8 | Not null |
| Attributes | Varchar | 50 | Allows null |
| AsciiName | Varchar | 256 | Not null |
| UnicodeName | Nvarchar | 256 | Allows null |
| ShortName | Varchar | 256 | Allows null |
| ParentID | Char | 40 | Allows null |
| HashContent | Char | 40 | Allows null |

Since a directory can contain directories and files, records in this table will have a reference to other records in this table. This reference will be represented by the field ParentID. For the root directory, the ParentID will have a NULL (no value) value. For example, the directory tree below will have the following entries in this table:

| ID | ParentID |
|---|---|
| DIR1 | NULL |
| DIR2 | DIR1 |
| DIR3 | DIR1 |
| DIR4 | DIR2 |
| File1 | DIR4 |
| File2 | DIR4 |
| File3 | DIR3 |
| DIR5 | DIR3 |

The field ContentHash is computed using the hash algorithm on the file's content. For records representing directories, this field will have a NULL value. This field relates this table with the table prdContents.

When a record is deleted from this table, a database trigger will delete related records from the tables prdFileSource and prdFiles (other folders that are children of this record). In addition, this trigger will check and delete records from the prdContents table if the records are not related to other records from the tables prdFiles (file content), prdMailItems (message body) or prdAttachments (attachment content).

2.3) Table prdMailBox

This table contains information on mail boxes from an e-mail system.

The primary key for this table is a forty bytes long field named MailBoxID. This field will be computed base on the RFC 3174 hash algorithm based on the Mail Box metadata. This field is required and the database will check for its uniqueness.

| Fields: | | | |
|---|---|---|---|
| Name | Type | Size | Comments |
| MailBoxID | Char | 40 | Not null, hashed, unique |
| Name | Char | 256 | Not null |
| UserName | Char | 256 | Allows null |
| Description | Char | 256 | Allows null |
| DisplayName | Char | 256 | Allows null |

The field Name is the unique Mail Box name, such as the "MS Exchange Mail Box Name".

When a record is deleted from this table, a database trigger will delete related records from the tables prdFileSource and prdMailFolders.

2.4) Table prdFileSource

This table contains data relating records from the prdSource (tapes, file systems, etc) to records from prdMailBoxes, prdMailItems or prdFiles.

RIFT will perform the following steps when a file is being processed:

1) RIFT will hash a value based the file metadata.
2) RIFT will check if there is a record in the prdFiles table whose FileID is the same as the hash value just calculated.
3) If the record does not exist, a new record will be added to the prdFiles table.
4) A new record will be added to the prdFileSource table.
5) RIFT will hash a new value based on the contents of the file.
6) RIFT will be added a new record to the table prdContents if hash value just calculated does not match one of the records in the prdContents table.

For a file system, the prdFileSource table will contain as many records as there are files and directories in the file system. For example, if a tape with a file system has 10 directories and 20 files, the prdFileSource table will contain a total of 30 records. When a backup of this tape is processed by the RIFT system, another 30 records will be added to this table. However, only records for files that are not identical will be added to the tables prdFiles and prdContents.

For email systems, RIFT will use the same process, storing data in the prdMailBox, prdMailItems, prdAttachments and prdFileSource tables.

The primary key for this table composed by two fields, a forty-bytes long field, FileID and a four-bytes integer field, SourceID. These fields are required and the database will check their uniqueness.

| | | Fields: | |
|---|---|---|---|
| Name | Type | Size | Comments |
| File ID | Char | 40 | Not Null, required, part of primary key, originated from tables prdFiles.FileID, prdMailBox.MailBoxID or prdMailItems.MailID |
| SourceID | Int | 4 | Not Null, required, part of primary key, originated from table prdSource |
| Type | Varchar | 20 | Not null |
| Date | Datetime | 8 | Not null |

The field Type indicates if the FileID field belongs to record from either one of the table prdMailBox, prdMailItem or prdFiles.
The field Date indicates when the record was created, allowing to trace how the filesystem was de-duplicated.

2.5) Table prdMailFolders

This table contains information on mail folders.

The primary key for this table is a forty bytes long field named FolderID. This field will be computed base on the hash algorithm using Mail Folder metadata. This field is required and the database will check for its uniqueness.

| | | Fields: | |
|---|---|---|---|
| Name | Type | Size | Comments |
| FolderID | Char | 40 | Not null, hashed, unique |
| Parent ID | Char | 40 | Not null, originated either from prdMailBox.MailBoxID or prdMailFolders.FolderID |
| Description | Varchar | 256 | Allows null |
| FolderType | Int | 4 | Not Null |
| DisplayName | Varchar | 256 | Not Null |
| ParentType | Varchar | 20 | Not Null |

Since a folder can contain folders and mail items, records in this table will have a reference to other records in this table. This reference will be represented by the field ParentID. For root folder the ParentID field will contain the MailBoxID of the parent Mail Box.

The field MailItemType indicates the folder type (mail, notes, calendar, etc). The field ParentType indicates if the folder parent is a Mail Box or another folder. Possible values for the FolderType are:

| | |
|---|---|
| DeletedItems = | 0x03 |
| Outbox = | 0x04 |
| SentMail = | 0x05 |
| Inbox = | 0x06 |
| Calendar = | 0x09 |

-continued

| | |
|---|---|
| Contacts = | 0x0A |
| Journal = | 0x0B |
| Notes = | 0x0C |
| Tasks = | 0x0D |
| Drafts = | 0x10 |
| Other = | 0x14 |

When a record is deleted from this table, a database trigger will delete related records from the tables prdMailItems and prdMailFolders (children of this record).

2.6) Table prdMailItems

This table contains information on mail items: mail messages, tasks, notes, appointments and journals.

The primary key for this table is a forty bytes long field named MailID. This field will be computed base on hash algorithm using the Mail Item metadata. This field is required and the database will check for its uniqueness.

| | | Fields: | |
|---|---|---|---|
| Name | Type | Size | Comments |
| MailID | Char | 40 | Not null, hashed, unique |
| FolderID | Char | 40 | Not null, relates to prdMailFolders.FolderID |
| Subject | Varchar | 256 | Allows null |
| From | Varchar | 256 | Not null |
| CreateDate | Datetime | 8 | Not null |
| SentDate | Datetime | 8 | Not null |
| ReceivedDate | Datetime | 8 | Not null |
| BodyHash | Char | 40 | Not null - foreign key on prdContents |
| Size | Int | 4 | Allows null |
| Sensitivity | Int | 4 | Allows null |
| Priority | Int | 4 | Allows null |

The CC, To and BCC data are stored in the table prdRecipients.

Possible values for the field Sensitivity are:
Normal=0,
Personal=1,
Private=2,
Confidential=3

Possible values for the field Priority are:
Low=0,
Noraml=1,
High=2

The field BodyHash will be computed using the hash algorithm on the file's content. For directories, this field is NULL. This field will relate, this table with the table prdContents.

When a record is deleted from this table, a database trigger will delete related records from tables prdAttachments and prdRecipients. In addition, this trigger will check and delete records from the prdContents table if the records are not related to other records from the tables prdFiles (file content), prdMailItems (message body) or prdAttachments (attachment content).

RIFT will perform the following steps when a file is being processed:
1) RIFT will hash a value based the mail item metadata.
2) RIFT will check if there is a record in the prdMailItems table whose MailID is the same as the hash value just calculated.
3) If the record does not exist, a new record will be added to the prdMailItems table.
4) A new record will be added to the prdFileSource table.

5) RIFT will hash a new value based on the contents of the email body.
6) RIFT will be added a new record to the table prdContents if hash value just calculated does not match one of the records in the prdContents table.
7) Add records for recipients (To, CC and BCC)

2.7) Table prdRecipients

This table contains information on mail items recipients: To, CC, BCC.

The primary key for this table is a combination of the fields MailID, Type and eMail. These fields are required and the will make the record unique.

Fields:

| Name | Type | Size | Comments |
| --- | --- | --- | --- |
| MailID | Char | 40 | Not null, relates to prdMailItems.MailID |
| Type | Char | 3 | Not null, possible values: BCC, CC or To |
| email | Varchar | 256 | Allows null, Recipient's e-mail address |

2.8) Table prdAttachments

This table contains information on attachments.

The primary key for this table is a forty bytes long field named AttachmentID. This field will be computed base on the hash algorithm using the attachment display name and file name. This field is required and the database will check for its uniqueness.

Fields:

| Name | Type | Size | Comments |
| --- | --- | --- | --- |
| AttachID | Char | 40 | Not null, hashed, unique |
| Mailed | Char | 40 | Not null, relates to prdMailItems.MailID |
| DisplayName | Varchar | 256 | Not null |
| FileName | Varchar | 256 | Allows null |
| ContentHash | Char | 40 | Not null, relates record to record on prdContents |

The field ContentHash is computed using the hash algorithm using the attachment's file content. This field will relate this table with the table prdContents.

A database trigger will check and delete records from the prdContents table if the records are not related to other records from the tables prdFiles (file content), prdMailItems (message body) or prdAttachments (attachment content).

2.9) Table prdContents

This table contains contents of files, mail item bodies and attachments.

The primary key for this table is a forty bytes long field named HashContent. This field will be computed base on the hash algorithm on the content. This field is required and the database will check it for uniqueness.

Fields:

| Name | Type | Size | Comments |
| --- | --- | --- | --- |
| ContentHash | Char | 40 | Not null, relates to prdFiles.ContentHash or prdMailItem.BodyHash or prdAttachments.ContentHash |
| Contents | Image | 16 | Not null |

Examples 2-5

To illustrate the following examples, in FIGS. 4-7 there are two pieces of source media, tape A and tape B. On tape A there is one file, called file 1, on tape B there is one file, called file 2. For each file, there is associated content, called respectively content 1 and content 2.

Example 2

Figure 4:
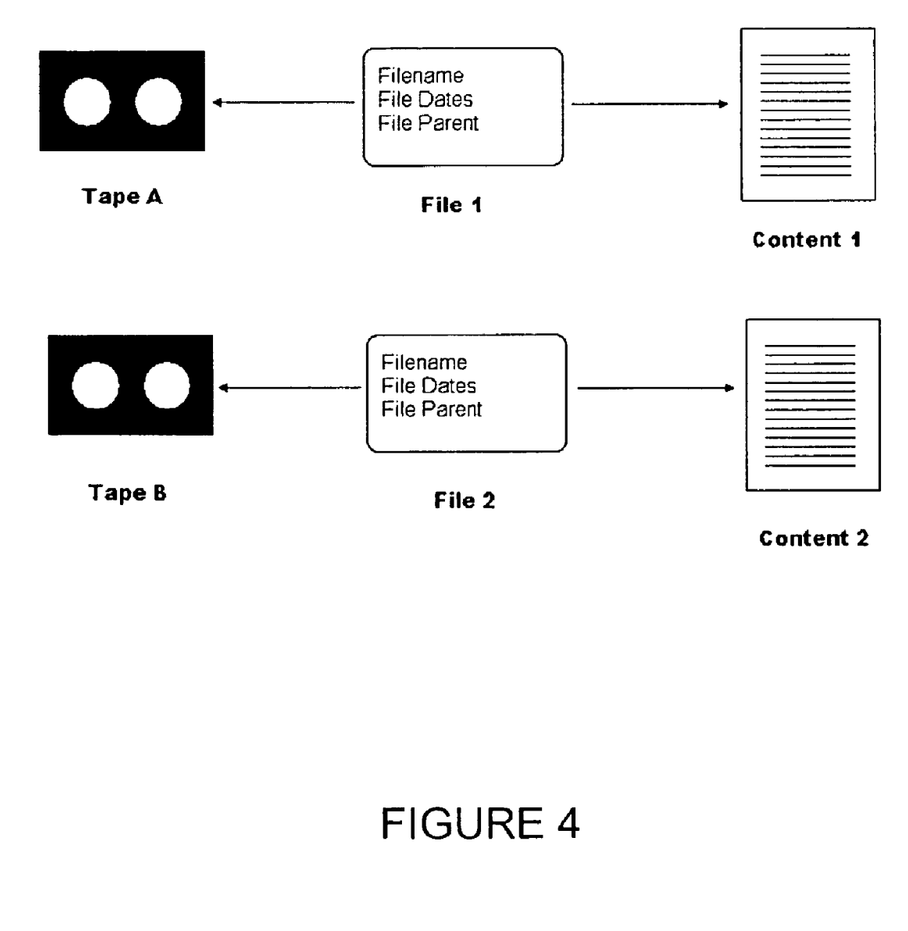
FIGS. 4-7 illustrate examples in keeping with embodiments of the present invention.

Illustrated in FIG. 4. The metadata and content of files 1 and 2 do not match. The resulting structure in the database may include two separate file entries with links back to the source media and links to their respective content.

Example 3

Figure 5:
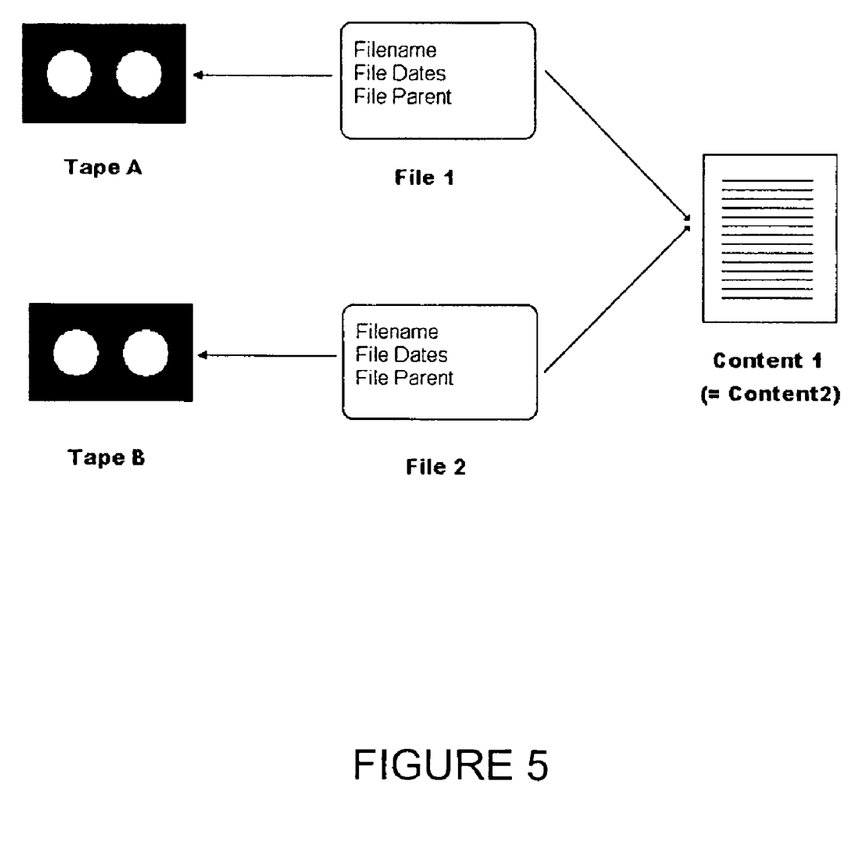

Illustrated in FIG. 5. The metadata of file 1 and file 2 do not match, but content 1 matches content 2. The resulting structure in the database would be two separate file entries with links back to the source media, and the links from file 1 and file 2 to their content both point to the same content value. This is an example of content de-duplication.

Example 4

Figure 6:
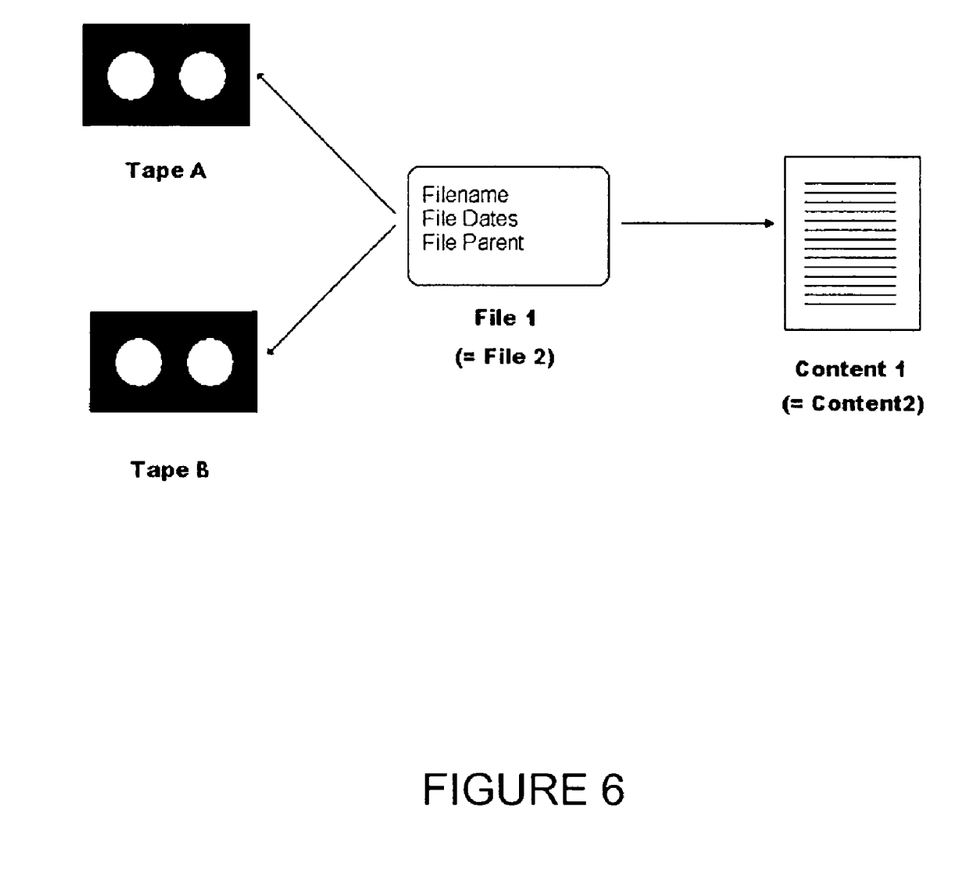

Illustrated in FIG. 6. If the exact same file appears on two different pieces of source media, this may be an example of full file de-duplication. In this case, both file 1 and file 2 may have identical metadata and identical content. The resulting database structure may be to have a single file record with links back to each source media that the file appeared on, and a link to the content.

Example 5

Figure 7:
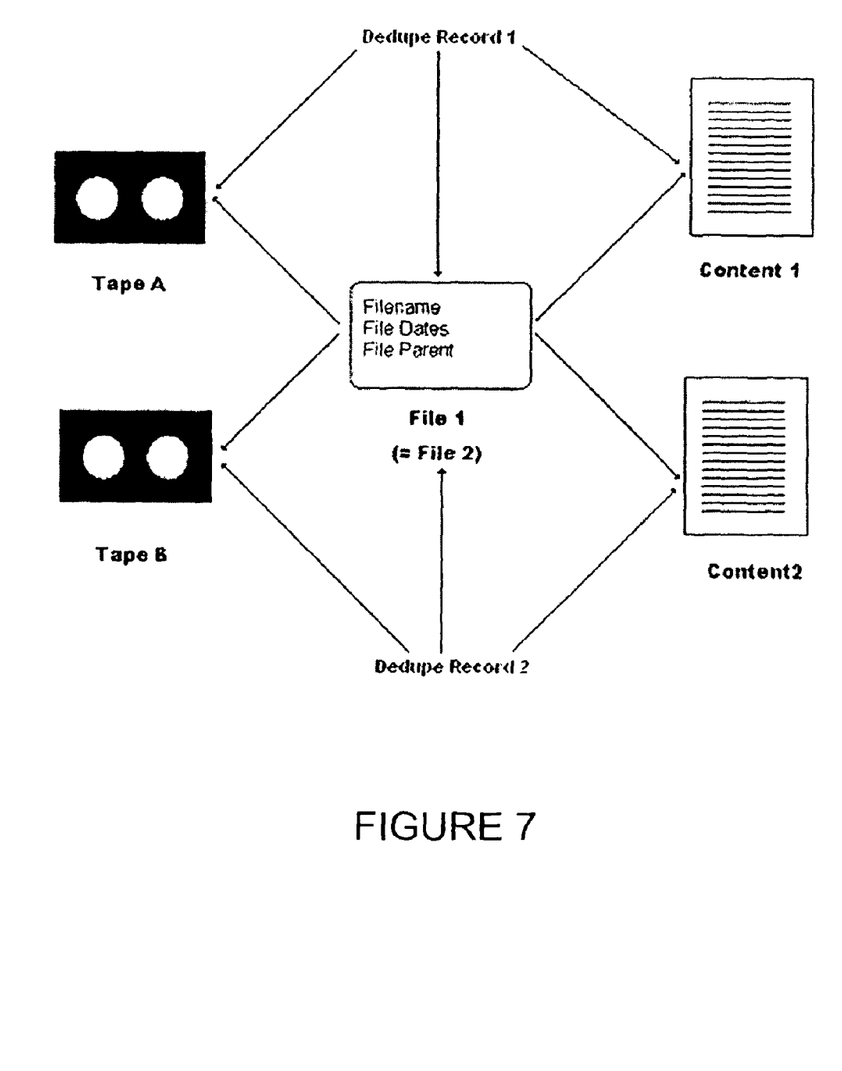

Illustrated in FIG. 7. In the unlikely event of two files having identical metadata but different content, the file record may only be present once, with the two files being distinguished by a de-duplication history table (which tells which piece of content belongs to which file at what instance in time).

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of extracting original data from at least one file that resides on one or more different mediums operating on one or more different platforms, wherein the original data is extracted and stored at a target location without unnecessary replication of duplicate data, comprising the steps of:
    obtaining content data and metadata relating to the original data of the at least one file, wherein the at least one file is stored in a first environment created on the one or more different mediums operating in the one or more different platforms;

in a second environment created on the one or more different mediums operating in the one or more different platforms and the target location, storing the content data and the metadata of the at least one file, wherein the content data is associated with the metadata, and wherein the second environment is different from the first environment;

obtaining an original location corresponding to the at least one file, the original location indicative of where the at least one file is stored in the first environment;

in the second environment, storing the original location in a location table, wherein the location table includes the following:
  a link to the content data stored in a content hash table, indexed in response to the original location indicative of where the at least one file was stored in the first environment; and
  a link to the metadata stored in a metadata hash table, indexed in response to the original location where the file was stored in the first environment;

reconstituting at least a piece of the at least one file by accessing at least one of the following in the location table:
  the link to the content data, in response to the original location; and
  the link to the metadata, in response to the original location; and storing the content data in the content hash table and the metadata in the metadata hash table, wherein the storing operation further comprises the steps of;
  generating a digital signature from the content data; and
  utilizing the digital signature to compare the content data of the least one file that is being extracted with content data already resident at the target location to avoid replication of content data and only storing content data that is not duplicative of the content data that is already resident at the target location.

2. The method of claim 1, wherein the step of storing the content and metadata further comprises the steps of:
  generating a digital signature from the metadata;
  storing the content in an entry in the content hash table, wherein the content's digital signature is an index into the content hash table, so that the content's digital signature is the link to the content; and
  storing the metadata in an entry in the metadata hash table, wherein the metadata's digital signature is an index into the metadata hash table, so that the metadata's digital signature is the link to the metadata.

3. The method of claim 2, wherein at least one or both of the digital signatures is generated using a hashing algorithm.

4. The method of claim 3, wherein the hashing algorithm is the SHA1 secure hashing algorithm.

5. The method of claim 2, wherein the entry in the content hash table comprises the content data and the link to the metadata.

6. The method of claim 5, wherein the entry in the metadata hash table comprises the metadata and the link to the content data.

7. The method of claim 2, wherein the location table is a location hash table, and wherein storing the location comprises the steps of:
  generating a digital signature from the location; and
  storing the original location in an entry in the location hash table, wherein the location's digital signature is an index into the location hash table, so that the location hash table is indexed in response to the original location by indexing with the location's digital signature.

8. A data processing system comprising at least one computer and one or more data sources that are either stand alone or networked, the data processing system for storing components of at least one file that was stored in a first environment at the one or more data sources, the data processing system utilizing code embodied within the data processing system configured to perform operations, the operations comprising:
  obtaining content data and metadata relating to the original data of the at least one file, wherein the at least one file is stored in a first environment created on the one or more different mediums operating in the one or more different platforms;
  in a second environment created on the one or more different mediums operating in the one or more different platforms and the target location, storing the content data and the metadata of the at least one file, wherein the content data is associated with the metadata, and wherein the second environment is different from the first environment;
  obtaining an original location corresponding to the at least one file, the original location indicative of where the at least one file is stored in the first environment;
  in the second environment, storing the original location in a location table, wherein the location table includes the following:
    a link to the content data stored in a content hash table, indexed in response to the original location indicative of where the at least one file was stored in the first environment; and
    a link to the metadata stored in a metadata hash table, indexed in response to the original location where the file was stored in the first environment;
  reconstituting at least a piece of the at least one file by accessing at least one of the following in the location table:
    the link to the content data, in response to the original location; and
    the link to the metadata, in response to the original location; and
  storing the content data in the content hash table and the metadata in the metadata hash table, wherein the storing operation further comprises the steps of;
    generating a digital signature from the content data; and
    utilizing the digital signature to compare the content data of the least one file that is being extracted with content data already resident at the target location to avoid replication of content data and only storing content data that is not duplicative of the content data that is already resident at the target location.

9. The data processing system of claim 8, wherein the operation of storing the content and metadata further comprises the operations of:
  generating a digital signature from the metadata;
  storing the content in an entry in the content hash table, wherein the content's digital signature is an index into the content hash table, so that the content's digital signature is the link to the content; and
  storing the metadata in an entry in the metadata hash table, wherein the metadata's digital signature is an index into the metadata hash table, so that the metadata's digital signature is the link to the metadata.

10. The data processing system of claim 9, wherein at least one or both of the digital signatures is generated using a hashing algorithm.

11. The data processing system of claim 10, wherein the hashing algorithm is the SHA1 secure hashing algorithm.

12. The data processing system of claim 9, wherein the entry in the content hash table comprises the content data and the link to the metadata.

13. The data processing system of claim 12, wherein the entry in the metadata hash table comprises the metadata and the link to the content data.

14. The data processing system of claim 9, wherein the location table is a location hash table, and wherein storing the location comprises the operations of:
   generating a digital signature from the location; and
   storing the original location in an entry in the location hash table, wherein the location's digital signature is an index into the location hash table, so that the location hash table is indexed in response to the original location by indexing with the location's digital signature.

15. A non-transitory computer readable medium including instructions configured to utilize code for storing information related to at least one file, wherein the code is embodied within the data processing system, the code comprising instructions configured to perform operations including:
   obtaining content data and metadata relating to the original data of the at least one file, wherein the at least one file is stored in a first environment created on the one or more different mediums operating in the one or more different platforms;
   in a second environment created on the one or more different mediums operating in the one or more different platforms and the target location, storing the content data and the metadata of the at least one file, wherein the content data is associated with the metadata, and wherein the second environment is different from the first environment;
   obtaining an original location corresponding to the at least one file, the original location indicative of where the at least one file is stored in the first environment;
   in the second environment, storing the original location in a location table, wherein the location table includes the following:
      a link to the content data stored in a content hash table, indexed in response to the original location indicative of where the at least one file was stored in the first environment; and
      a link to the metadata stored in a metadata hash table, indexed in response to the original location where the file was stored in the first environment;
   reconstituting at least a piece of the at least one file by accessing at least one of the following in the location table:
      the link to the content data, in response to the original location; and
      the link to the metadata, in response to the original location; and
   storing the content data in the content hash table and the metadata in the metadata hash table, wherein the storing operation further comprises the steps of;
      generating a digital signature from the content data; and
      utilizing the digital signature to compare the content data of the least one file that is being extracted with content data already resident at the target location to avoid replication of content data and only storing content data that is not duplicative of the content data that is already resident at the target location.

16. The computer readable medium of claim 15, wherein the operation of storing the content and metadata further comprises the operations of:
   generating a digital signature from the metadata;
   storing the content in an entry in the content hash table, wherein the content's digital signature is an index into the content hash table, so that the content's digital signature is the link to the content; and
   storing the metadata in an entry in the metadata hash table, wherein the metadata's digital signature is an index into the metadata hash table, so that the metadata's digital signature is the link to the metadata.

17. The computer readable medium of claim 16, wherein at least one or both of the digital signatures is generated using a hashing algorithm.

18. The computer readable medium of claim 17, wherein the hashing algorithm is the SHA1 secure hashing algorithm.

19. The computer readable medium of claim 16, wherein the entry in the content hash table comprises the content data and the link to the metadata.

20. The computer readable medium of claim 19, wherein the entry in the metadata hash table comprises the metadata and the link to the content data.

21. The computer readable medium of claim 16, wherein the location table is a location hash table, and wherein storing the location comprises the operations of:
   generating a digital signature from the location; and
   storing the original location in an entry in the location hash table, wherein the location's digital signature is an index into the location hash table, so that the location hash table is indexed in response to the original location by indexing with the location's digital signature.

* * * * *